(12) United States Patent
Francisco et al.

(10) Patent No.: US 10,901,473 B2
(45) Date of Patent: Jan. 26, 2021

(54) POWER ADAPTER WITH NETWORKING

(71) Applicant: Comcast Cable Communications, LLC, Philadelphia, PA (US)

(72) Inventors: Mark Francisco, Clarksburg, NJ (US); Christopher Stone, Newtown, PA (US); Ted Grauch, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/733,942

(22) Filed: Jan. 3, 2020

(65) Prior Publication Data

US 2020/0213142 A1   Jul. 2, 2020

Related U.S. Application Data

(63) Continuation of application No. 15/363,637, filed on Nov. 29, 2016, now Pat. No. 10,567,178.

(51) Int. Cl.
| | |
|---|---|
| *G06F 1/26* | (2006.01) |
| *H04L 12/28* | (2006.01) |
| *H04N 21/436* | (2011.01) |
| *H04N 21/4363* | (2011.01) |
| *H01R 31/06* | (2006.01) |

(52) U.S. Cl.
CPC .............. *G06F 1/26* (2013.01); *H01R 31/065* (2013.01); *H04L 12/2803* (2013.01); *H04N 21/436* (2013.01); *H04N 21/43615* (2013.01); *H04N 21/43632* (2013.01); *H04N 21/43637* (2013.01)

(58) Field of Classification Search
CPC .............. G06F 1/26; H04B 2203/5454; H04B 2203/5445; H04B 2203/547; H04B 3/548; H01R 31/065; H04M 1/72533; H04N 21/436; H04N 21/43615; H04N 21/43632; H04N 21/43637; H04N 21/64707; H04L 12/10; Y02B 70/3266; Y04S 20/242
See application file for complete search history.

(56) References Cited

U.S. PATENT DOCUMENTS

| | | | |
|---|---|---|---|
| 8,610,317 B2 | 12/2013 | Tsai et al. | |
| 2008/0162356 A1* | 7/2008 | Parket | G06Q 30/02 705/53 |
| 2010/0039552 A1 | 2/2010 | Kao | |
| 2013/0117585 A1 | 5/2013 | Chen et al. | |
| 2015/0221414 A1 | 8/2015 | Matsuoka et al. | |
| 2018/0077442 A1 | 3/2018 | Herz | |

OTHER PUBLICATIONS

TechPayout, "Bluetooth Revisited", Mar. 27, 2014, retrieved from https://techpayout.com/blog/2014/03/27/bluetooth-revisited/ on Jun. 8, 2018 (Year: 2014).
RKM, "Turn your PC into a Z-Wave Home Controller", Aug. 10, 2014, retrieved from https://www.rkmsmarthome.com.au/blog/ <http://www.rkmsmarthome.com.au/blog/> turn-your-pc-into-a-z-wave-home-controller on Aug. 6, 2018 (Year: 2014).

* cited by examiner

*Primary Examiner* — Ryan Johnson
(74) *Attorney, Agent, or Firm* — Banner & Witcoff, Ltd.

(57) ABSTRACT

Methods and systems are described for a power adapter. The power adapter may provide power to a computing device. The power adapter may comprise a wireless access point or other communication system. The computing device may be configured to access the wireless access point or other communications systems in the power adapter.

20 Claims, 8 Drawing Sheets

POWER ADAPTER WITH NETWORKING

CROSS-REFERENCE TO RELATED APPLICATIONS

This application is a continuation of U.S. application Ser. No. 15/363,637, filed Nov. 29, 2016, which is hereby incorporated by reference in its entirety.

BACKGROUND

Users seeking to access media may use a device, such as a set-top box (STB), to access features and content. The device may comprise various communication interfaces, such as a Wi-Fi interface or an Ethernet interface. The device may output content for display on a television or other display device.

Home automation systems may be used to control appliances or other devices, such as electronic devices, within a home. Home automation commands may be transmitted over a wired or wireless connection to home automation devices. A home automation protocol for transmitting the home automation commands may be configured to operate on a wireless interface, such as Wi-Fi.

SUMMARY

The following summary is for illustrative purposes only, and is not intended to limit or constrain the detailed description. The following summary merely presents various described aspects in a simplified form as a prelude to the more detailed description provided below.

In certain instances, it may be preferable to physically separate the various systems or components that comprise a device, such as a set-top box (STB) or any other device configured to output content. For example, a user may wish to place the device in a location that is hidden from view, but that location may limit the range of a Wi-Fi access point contained in the device. Thus, rather than constructing the device with an integrated Wi-Fi access point, it may be preferable to place the Wi-Fi access point in a power adapter, or power supply unit, connected to the device. The power adapter with the Wi-Fi access point may then be positioned in a location that provides for improved Wi-Fi range, while the device can be placed in the location that is hidden from view.

In certain instances, a user or content provider may wish to add or remove support for communication protocols or features from the device. For example, a user may wish to add home automation protocol features to a device that does not have an integrated home automation protocol communication system. Rather than replacing the device to add home automation protocol functionality, a user may replace a power adapter connected to the device with a power adapter that comprises a home automation protocol system. In another example, a power adapter with a Wi-Fi interface may be connected to a device without integrated Wi-Fi hardware. In this manner, the power adapter of the device is replaced to add hardware components to the system, rather than replacing the entire device.

A power adapter with one or more networking interfaces or components may communicate with the device using a proxy system. For example, a proxy system may be integrated within the power adapter and the device, and may allow two-way communication between the device and the power adapter. Using the proxy system, the device may access components within the power adapter. In this manner, the device can behave as if the components in the power adapter are integrated within the device.

The proxy system may be configured to convert or encapsulate data in a variety of formats. For example, the proxy system may encapsulate data received in a wireless protocol so that the data may be transmitted over an Ethernet network. In another example, the proxy system may receive home automation commands over an Ethernet network, and prepare the commands for transmission via a home automation protocol.

The summary here is not an exhaustive listing of the novel features described herein, and are not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural or functional modifications may be made, without departing from the scope of the present disclosure.

Figure 1:
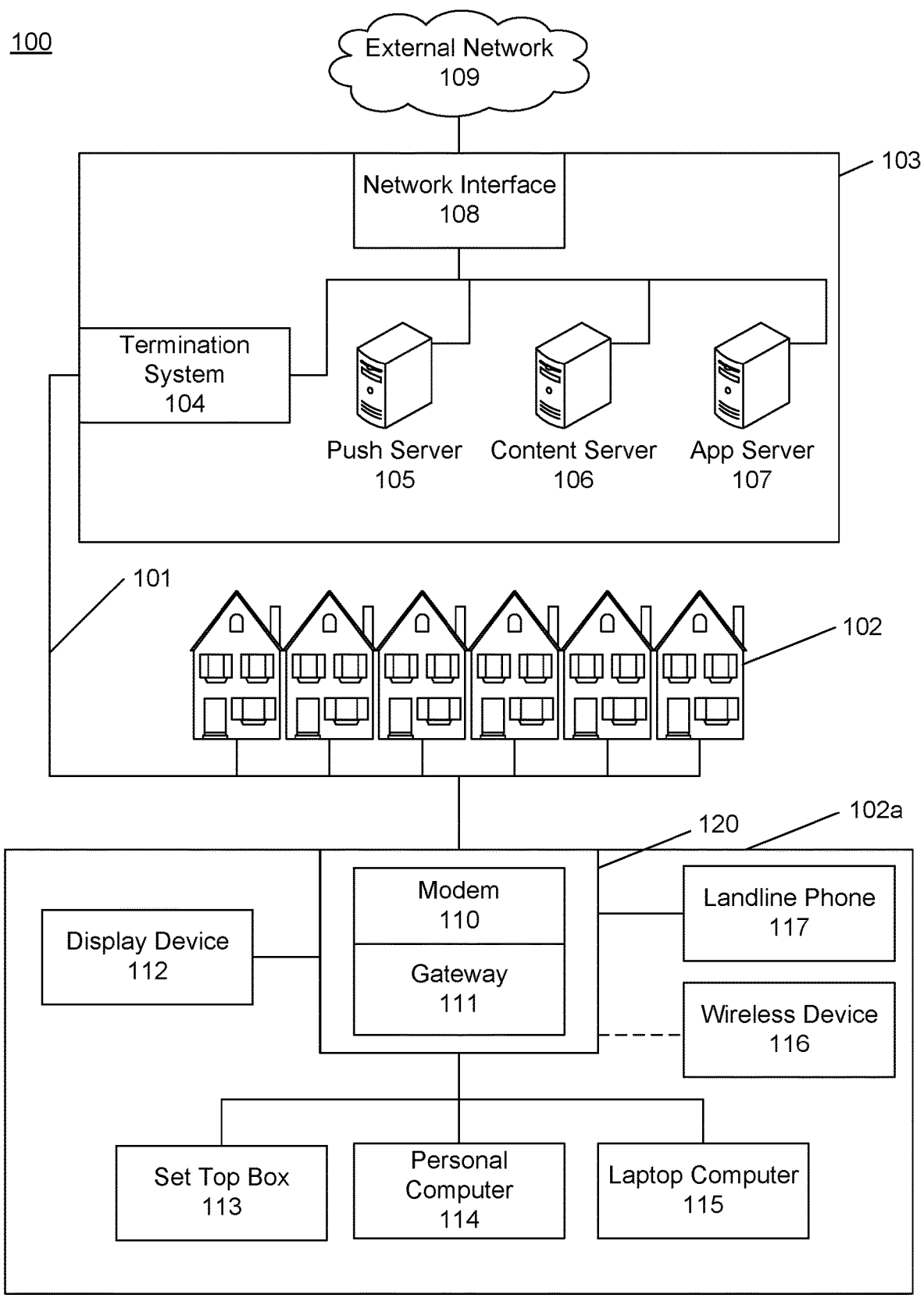
FIG. 1 shows an example communication network on which various features described herein may be used.

FIG. 1 shows an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101, such as coaxial cables, optical fibers, or wireless links to connect multiple premises 102, such as businesses, homes, or user dwellings to a local office 103 or headend. The local office 103 may transmit downstream information signals onto the links 101, and the premises 102 may have receivers used to receive and process those signals.

In one example, there may be one link 101 originating from the local office 103, and it may be split a number of times to distribute the signal to various premises 102 in the vicinity, which may be many miles, of the local office 103. The links 101 may include components such as splitters, filters, amplifiers, etc., to help convey the signal clearly, but in general each split introduces a bit of signal degradation. Portions of the links 101 may also be implemented with fiber-optic cable, while other portions may be implemented with coaxial cable, other lines, or wireless communication paths. In one example, fiber optic cable may be used along some portions, and signal degradation may be significantly minimized. In this example, a single local office 103 may, as a result of the fiber optic cable, be able to reach even farther with its network of links 101.

The local office 103 may include an interface 104, such as a termination system (TS). For example, the interface 104 may be a cable modem termination system (CMTS), which may be a computing device configured to manage communications between devices on the network of links 101 and backend devices such as servers 105-07. The interface 104 may be as specified in a standard, such as the Data Over Cable Service Interface Specification (DOCSIS) standard, published by Cable Television Laboratories, Inc. (a.k.a. CableLabs), or it may be a similar or modified interface instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks, such as a WiMAX network, satellite networks, or any other desired network. The network interface 108 may include the corresponding circuitry needed to communicate on the external networks 109, and to other devices on the network such as a cellular telephone network and its corresponding cell phones.

As noted above, the local office 103 may include a variety of servers 105-07 that may be configured to perform various functions. For example, the local office 103 may include a push notification server 105. The push notification server 105 may generate push notifications to deliver data or commands to the various premises 102 in the network or to the devices in the premises 102 that are configured to detect such notifications. The local office 103 may also include a content server 106. The content server 106 may be one or more computing devices that are configured to provide content to users at their premises. This content may be, for example, video on demand movies, television programs, songs, text listings, or other types of content. The content server 106 may include software to validate user identities and entitlements, to locate and retrieve requested content, to encrypt the content, and to initiate delivery, in one example, by streaming, of the content to the requesting user or device.

The local office 103 may also include one or more application servers 107. An application server 107 may be a computing device configured to offer any desired service, and may run various languages and operating systems, such as servlets and JSP pages running on Tomcat/MySQL, OSX, BSD, Ubuntu, Redhat, HTML5, JavaScript, AJAX, or COMET.

For example, an application server may be responsible for collecting television program listings information and generating a data download for electronic program guide listings. In some aspects of the disclosure, application server 107 may be responsible for monitoring user viewing habits and collecting that information for use in selecting advertisements. In other embodiments, application server 107 may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem, for coaxial cable links 101, a fiber interface node, for fiber optic links 101, a twisted-pair telephone modem, a cellular telephone transceiver, a satellite transceiver, a local Wi-Fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem 110 to allow one or more other devices in the premises 102a, to communicate with the local office 103 and other devices beyond the local office 103. The gateway interface device 111 may be a set-top box 113 (STB), digital video recorder (DVR), computer server, or any other desired computing device. The gateway interface device 111 may also include local network interfaces to provide communication signals to requesting entities or devices in the premises 102a, such as display devices 112, for example, televisions, additional STBs 113 or DVRs, personal computers 114, laptop computers 115, wireless devices 116 such as wireless routers, wireless laptops, notebooks, tablets, netbooks, or smart phones, cordless phones, for example, Digital Enhanced Cordless Telephone—DECT phones, mobile phones, mobile televisions, personal digital assistants (PDA), landline phones 117, which may be Voice over Internet Protocol (VoIP) phones, and any other desired devices. Examples of the local network interfaces include Multimedia Over Coax Alliance (MoCA) interfaces, Ethernet interfaces, universal serial bus (USB) interfaces, wireless interfaces such as IEEE 802.11 or IEEE 802.15, analog twisted pair interfaces, Bluetooth interfaces, and others. As described below and in FIG. 3, the gateway interface device 111, such as the set-top box 113, may be connected to a power adapter 310 comprising one or more of the network interfaces or other components. The network interfaces in the power adapter 310 may be used by the gateway interface device 111. For example, the gateway interface device 111 might not include an integrated Wi-Fi access point 312, but the gateway interface device 111 may provide a Wi-Fi network by accessing a Wi-Fi access point 312 in the power adapter 310.

Figure 2:
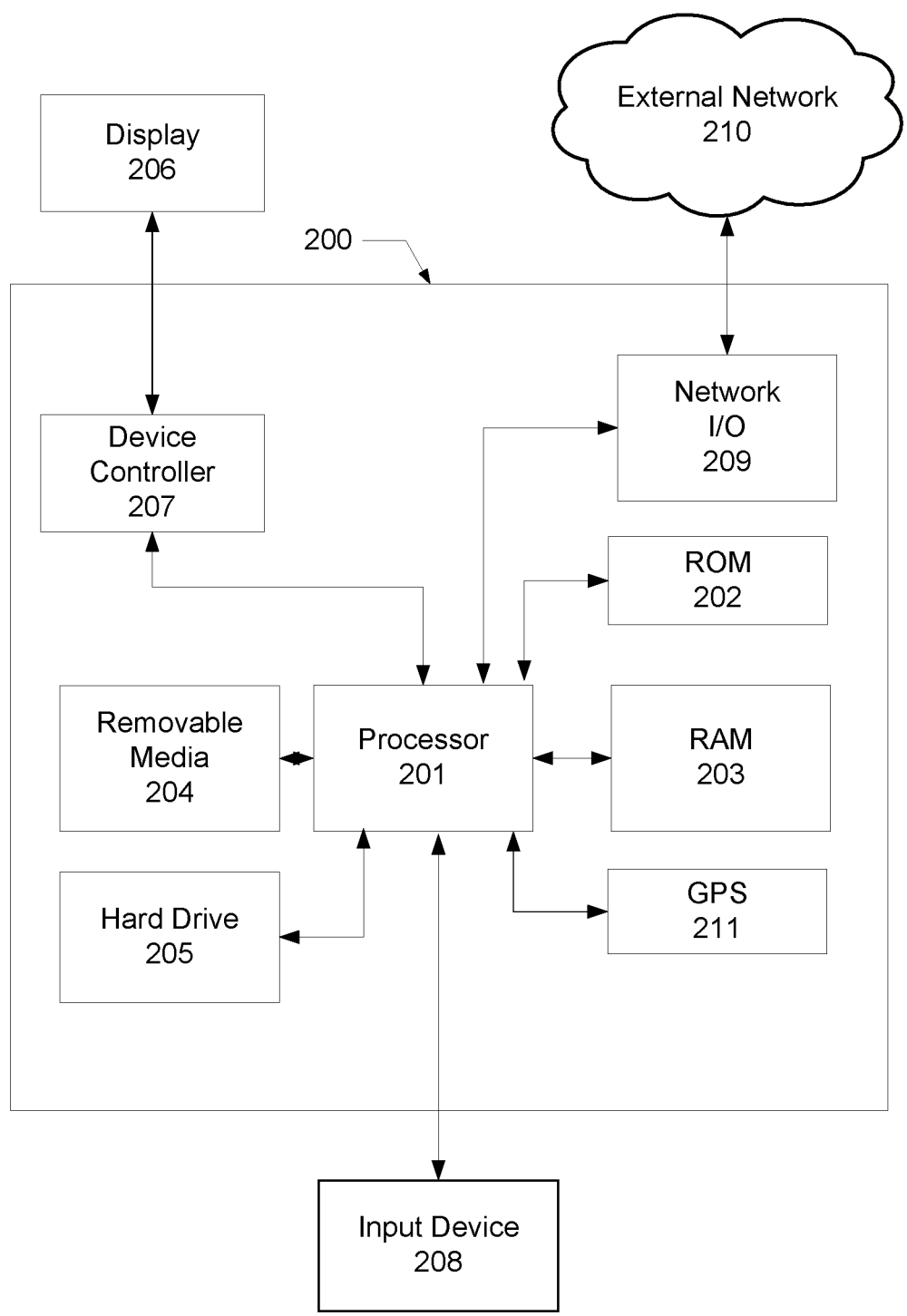
FIG. 2 shows an example computing device that may be used to implement any of the methods described herein.

FIG. 2 shows general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached, or internal, hard drive 205. The computing device 200 may include one or more output devices, such as a display 206, for example, an external television, and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209, for example, a network card, to communicate with an external network 210. The network I/O circuit 209 may be a wired interface, wireless interface, or a combination of the two. In some embodiments, the network I/O circuit 209 may include a modem, such as a cable modem, and the external network 210 may include the communication links 101 discussed above, the external network 109, an in-home network, a provider's wireless, coaxial, fiber, or hybrid fiber/coaxial distribution system, such as a DOCSIS network, or any other desired network. As described below and in FIG. 3, a power adapter 310 connected to the computing device 200 may comprise all or a portion of the network I/O circuit 209. For example, the power adapter 310 may comprise a wired interface, and the computing device 200 may access the wired interface when the power adapter 310 is connected to the computing device 200. The power adapter 310 may provide power for the computing device 200. For example, the power adapter 310 may be a power supply unit. Additionally, the computing device 200 may include a location-detecting device, such as a global positioning system (GPS) microprocessor 211, which can be configured to receive and process global positioning signals and determine, with possible assistance from an external server and antenna, a geographic position of the device 200.

FIG. 2 illustrates a hardware configuration of the device 200, but it should be understood that some or all of the illustrated components may be implemented as software. Modifications may be made to add, remove, combine, or divide components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform. For example, a requesting entity can be a separate software process and program from a dependent entity, both of which may be executed as software on a common computing device.

One or more aspects of the disclosure may be embodied in a computer-usable data or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
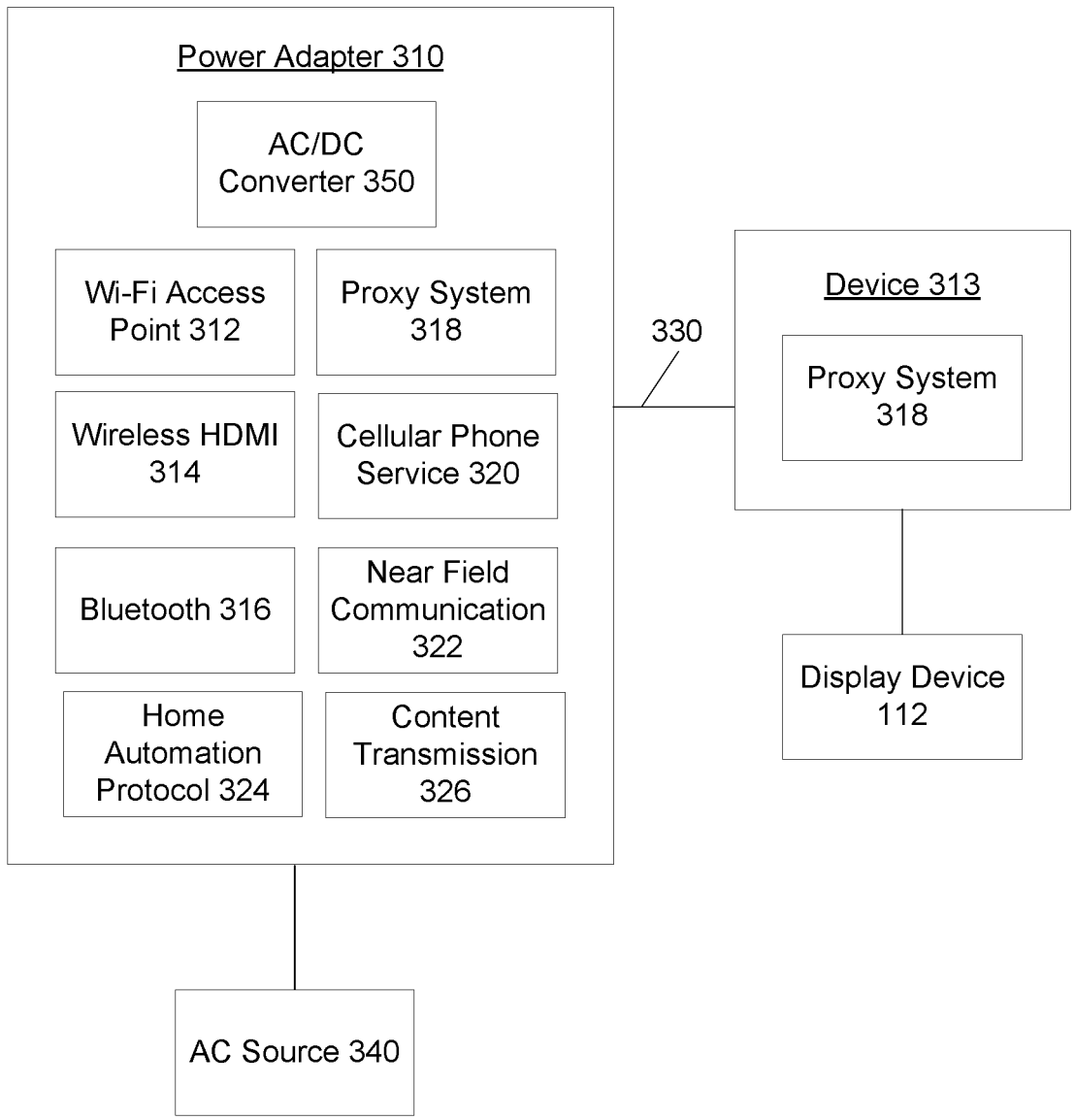
FIG. 3 is a block diagram of a power adapter according to one or more illustrative aspects of the disclosure.

FIG. 3 is a block diagram of a power adapter 310 according to one or more illustrative aspects of the disclosure. The power adapter 310 may be connected to a device 313. For example, the power adapter 310 may be connected via a connection 330, to the STB 113 or any other computing device 200. The power adapter 310 may act as a power source for the device 313. For example, the power adapter 310 may be connected to an AC source 340, such as a home AC power system in a premises 102, i.e., a power mains. The power adapter 310 may deliver the DC output of the AC/DC converter 350 to the device 313. In one example, the power adapter 310 may be connected via the connection 330 to a gateway interface device 111, such as a router.

The power adapter 310 may comprise input circuitry for inputting AC power and converting it to DC power. Exemplary input circuitry may include an AC/DC converter 350, such as an AC/DC transformer, AC/DC switching converter, and/or other AC/DC integrated converter circuitry such as those made by, for example, STMicroelectronics, Texas Instruments, and Power Integrations, to convert power from the AC source 340 to DC power. The power adapter 310 may comprise output circuitry configured for DC power which may be variously configured. For example, the output circuitry may be configured as a modulator for modulating data onto the DC power output. This data may be modulated in a suitable manner such as with one or more of frequency, amplitude, and/or phase shift modulation circuits. The power adapter 310 may comprise output circuitry configured for DC power and one or more communication signals. For example, the output circuitry may comprise modulation circuitry, which may be configured to modulate the one or more communication signals onto the DC power output and output the combined signal via the connection 330. The output circuitry may transmit the one or more communication signals on, for example, different frequencies overlaid on DC power. The communication signals may be half duplex and/or full duplex and may have different types of data either frequency and/or time separated. For example, wireless data may be modulated at one frequency, while Bluetooth data may be modulated at a different frequency, and cellular data at yet another frequency. In other embodiments, the data may be assigned different resource blocks and/or channels. The output circuitry may comprise a Power over Ethernet (PoE) circuit. The input circuitry and output circuitry may be separate or combined.

The device 313 may comprise input circuitry configured for inputting communication signals, DC power, video signals, or other signals. For example, the device 313 may comprise first input circuitry configured to receive a video signal, and second input circuitry configured to receive DC power and one or more communication signals. The second input circuitry may comprise a PoE circuit. The first input circuitry and second input circuitry may be combined or separate. The input circuitry of the device 313 may be coupled to the output circuitry of the power adapter 310.

The connection 330 may deliver the power from the power adapter 310 to the device 313. The connection 330 may carry data between the power adapter 310 and device 313. For example, the connection 330 may be a PoE connection. In one example, the connection 330 may comprise two separate connections, a first connection that delivers power, and a second, separate data connection. In another example, the data portion of the connection 330 may be wireless. The power adapter 310 may comprise one or more wireless or wired network interfaces.

The power adapter 310 may include a wireless access point, such as a Wi-Fi access point 312. The Wi-Fi access point 312 may be configured to create a wireless network or wirelessly connect to another device. For example, a smart phone may be able to connect to the power adapter 310 via the Wi-Fi access point 312. In this example, after connecting to the power adapter 310 via the Wi-Fi access point 312, the smart phone may be able to communicate with the device 313 via the connection 330. In one example, rather than a Wi-Fi access point 312, the power adapter 310 may include a Wi-Fi adapter configured to connect to a Wi-Fi access point or to another Wi-Fi device.

The power adapter 310 may include a wireless high-definition multimedia interface (HDMI) system 314, or any other wireless video interface or system compatible with a wireless video protocol. The wireless HDMI system 314 may be used to wirelessly transmit video, audio, or other data to the device 313 or the display device 112. The wireless HDMI system 314 may be configured to receive wireless HDMI signals, transmit wireless HDMI signals, or both.

The power adapter 310 may include a wireless personal area network (WPAN) circuit, such as a Bluetooth™ system 316. The Bluetooth™ system 316 may be used to wireless transmit or receive data. For example, a smart phone may communicate with the Bluetooth™ system 316 to transmit audio to the power adapter 310, and via the connection 330, to the device 313.

The power adapter 310 may include a cellular phone service 320 configured to communicate with cellular telephones. For example, the service 320 may be an LTE™ connection, and a smart phone may communicate with the power adapter 310 via the LTE™ connection. The cellular phone service 320 may be used to initiate or maintain a phone call. The cellular phone service 320 may be used to transmit data between a wireless device 116 and the power adapter 310 or the device 313.

The power adapter 310 may include a near field communication (NFC) system 322. The NFC system 322 may be used to transmit and receive data. For example, the NFC system 322 may be used to transmit data between a wireless device 116 and the power adapter 310 when the wireless device 116 is proximal to the power adapter 310.

The power adapter 310 may include a home automation protocol system 324, such as a wireless home automation protocol system 324. The home automation protocol system 324 may comprise a WPAN system. The home automation protocol system 324 may be used to communicate with various home automation systems. For example, the home automation protocol system 324 may transmit commands to turn on and off lights, turn on and off power systems, control locks, control appliances, or other home automation commands. The home automation protocol system 324 may receive data from various home automation systems. For example, a home automation sensor may transmit data to the home automation protocol system 324.

The home automation protocol system 324 may be, or be compatible with, a ZigBee™ system, a ZigBee™ RF4CE system, a Z-Wave™ system, an X10™ system, an Insteon™ system, or any other type of home automation system or protocol.

The power adapter 310 may include a content transmission system 326, e.g., a Miracast™ system. The content transmission system 326 may be used to receive videos or other data. For example, a wireless device 116 may transmit a video to the content transmission system 326, which may then transmit the video to the device 313. In this example, the device 313 may then output the video on the display device 112.

The power adapter 310 may include a proxy system 318. The device 313 may also include a proxy system 318. In one example, the proxy system 318 in the power adapter 310 may be different from the proxy system 318 in the device 313. The proxy system 318 may manage communications between the power adapter 310 and the device 313. The proxy system 318 may allow the device 313 to use the Wi-Fi access point 312, the wireless HDMI system 314, the Bluetooth™ system 316, the cellular phone service 320, the NFC system 322, the home automation protocol system 324, or the content transmission system 326. For example, rather than including a Wi-Fi system in the device 313, the device 313 may use the proxy system 318 to access the Wi-Fi access point 312 in the power adapter 310.

The proxy system 318 may be configured to encapsulate data for communication over alternative protocols, or convert data between protocols. For example, a content transmission signal, such as a Miracast™ signal, may be received wirelessly at the content transmission system 326 and the received packets may be encapsulated by the proxy system 318. The encapsulated packets may then be transmitted over an Ethernet connection to the device 313. In another example, a home automation command may be received over an Ethernet connection. The home automation command may then be converted by the proxy system 318 to a home automation protocol format, and transmitted using the home automation protocol system 324.

Although the Wi-Fi access point 312, the wireless HDMI system 314, the Bluetooth™ system 316, the cellular phone service 320, the NFC system 322, the home automation protocol system 324, or the content transmission system 326 are illustrated as part of the power adapter 310, any or all of these systems may be included in the device 313 or another device. Additionally, the power adapter 310 or device 313 may comprise one or more wired networking interfaces. For example, the power adapter 310 or device 313 may comprise a MoCA interface or an Ethernet interface.

Figure 4:
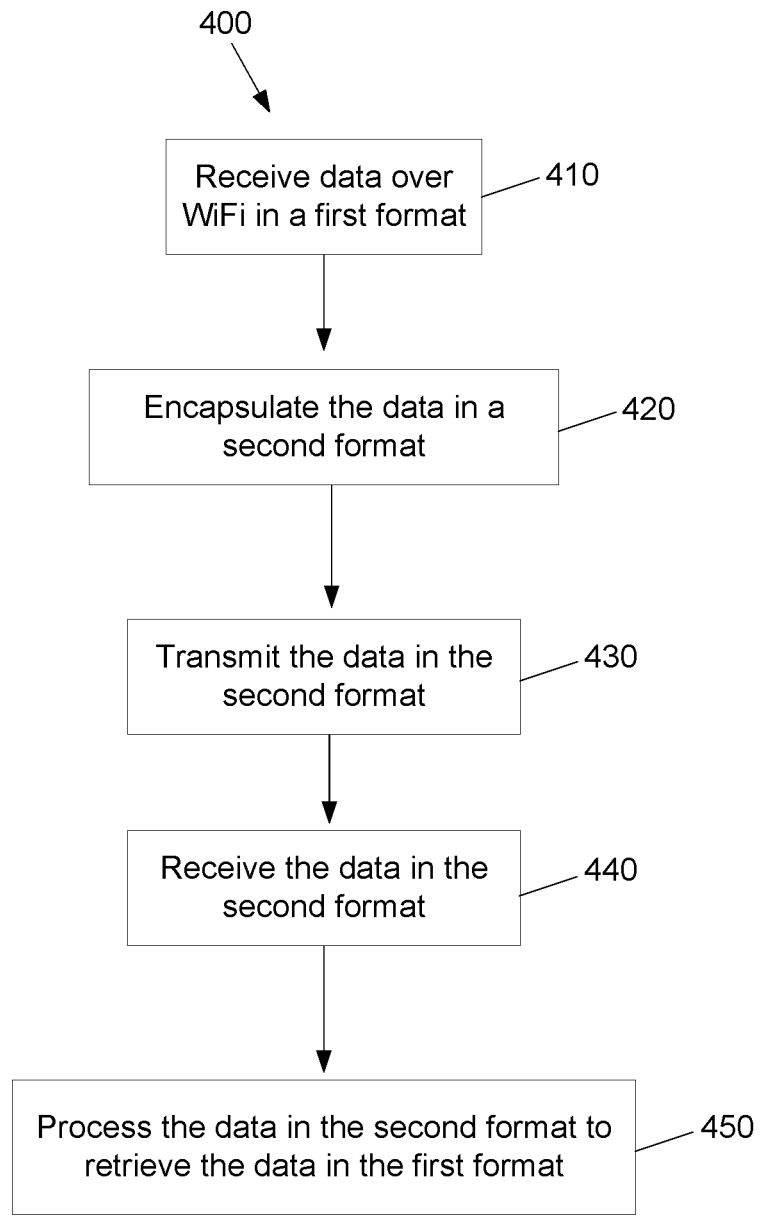
FIG. 4 is a flow diagram of a method for encapsulating data according to one or more illustrative aspects of the disclosure.

FIG. 4 is a flow diagram of a method 400 for encapsulating data according to one or more illustrative aspects of the disclosure. In one or more embodiments, the method 400 or one or more steps thereof may be performed by one or more computing devices or entities. For example, portions of the method 400 may be performed by components of the network 100 or the computing device 200. The method 400 or one or more steps thereof may be embodied in computer-executable instructions that are stored in a computer-readable medium, such as a non-transitory computer-readable medium. The steps in this flow diagram need not all be performed in the order specified and some steps may be omitted or changed in order.

At step 410, data may be received over Wi-Fi, or any other type of network or communication interface, in a first format. For example, at step 410, data may be received in a content transmission format, such as a Miracast™ format or another wireless video protocol format. In another example, at step 410, data may be received in a home automation command format, such as ZigBee™.

The data received at step 410 may be in a wireless format or a wireless protocol. For example, a content transmission protocol, e.g., the Miracast™ protocol, may be designed to be used over a wireless connection, not over a wired connection.

At step 420, the data received at step 410 may be encapsulated in a second format or protocol. For example, the data received at step 410 may be encapsulated according to the second format. In this example, the resulting data may be in the second format. Physical layer interfaces, such as Wi-Fi, MoCA™, Zigbee™, or others, may be converted to be compatible with an Ethernet based IP network. In one example, the data received at step 410 may be in a wireless format, such as a wireless format incompatible with a wired connection, and the data may be encapsulated, at step 420, in a format compatible with a wired connection. For example, if the data received at step 410 is Miracast™ data, then the data may be encapsulated at step 420 in a format compatible with a physical layer, such as a wired Ethernet connection.

The encapsulation described at step 420 may be performed by the proxy system 318 in the power adapter 310. For example, at step 420, the proxy system 318 may encapsulate the data received at step 410 in a format that is compatible with the device 313. In one example, the data may be compressed at step 420. For example, the data received at step 410 may be compressed prior to the encapsulation at step 420.

At step 430, the data encapsulated in the second format may be transmitted. For example, the power adapter 310 may transmit the data over the connection 330 to the device 313. The data may be transmitted over an Ethernet connection, or over any other type of wired or wireless data connection. At step 440, the data may be received in the second format. For example, the data may be received by the device 313.

At step 450, the encapsulation may be removed from the data received at step 440 to retrieve, recover, expose, or de-encapsulate, the data in the first format. For example, if the data received at step 410 is in a content transmission format, and then encapsulated at step 420 to a format compatible with Ethernet, at step 450 the content may be retrieved from the encapsulated data received at step 440. In one example, if the data was compressed prior to the encapsulation, the data may be decompressed at step 450.

Figure 5:
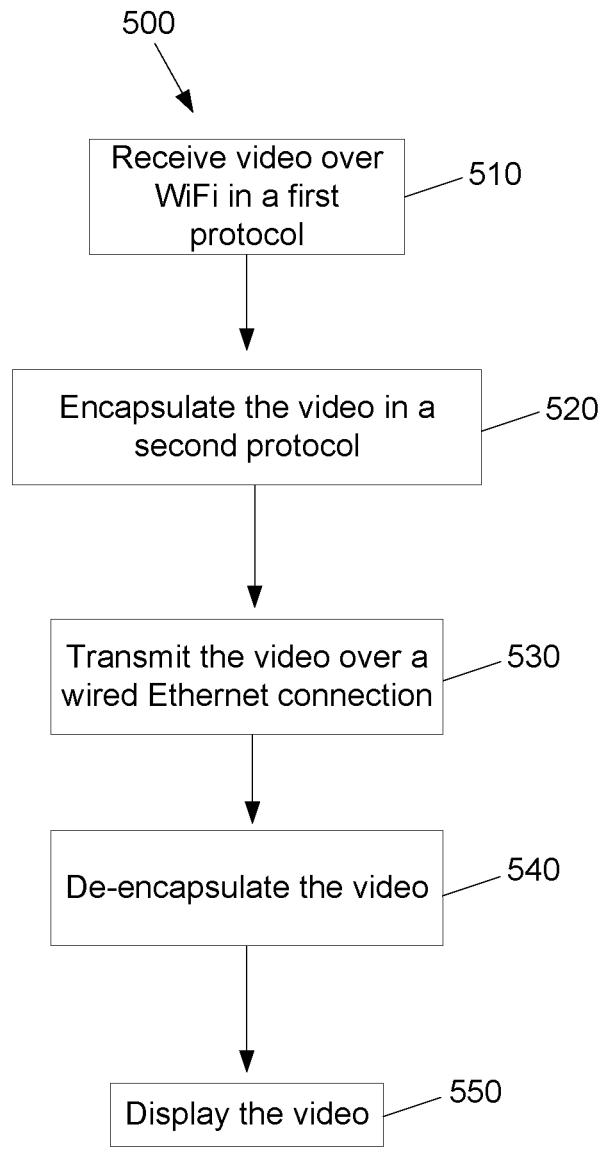
FIG. 5 is a flow diagram of a method for transmitting video according to one or more illustrative aspects of the disclosure.

FIG. 5 is a flow diagram of a method 500 for transmitting video according to one or more illustrative aspects of the disclosure. In one or more embodiments, the method 500 or one or more steps thereof may be performed by one or more computing devices or entities. For example, portions of the method 500 may be performed by components of the network 100 or the computing device 200. The method 500 or one or more steps thereof may be embodied in computer-executable instructions that are stored in a computer-readable medium, such as a non-transitory computer-readable medium. The steps in this flow diagram need not all be performed in the order specified and some steps may be omitted or changed in order.

At step 510, a video, or other content, may be received over a Wi-Fi connection, or another type of wireless connection, in a first protocol. For example, a smart phone or tablet may transmit a video to the power adapter 310 using a content transmission protocol, such as Miracast™.

At step 520, the video received at step 510 may be encapsulated in a second protocol. The proxy system 318 in the power adapter 310 may encapsulate the video. In one example, in addition to or as an alternative to encapsulating the data, the video may be converted to a different format or modified. For example, the resolution or dimensions of the video may be modified. The actions performed at step 520 may be similar to those described above at step 420 in FIG. 4.

At step 530, the video may be transmitted over a wired Ethernet connection, or another type of wired or wireless connection. For example, the video may be transmitted over the connection 330 from the power adapter 310 to the device 313. In another example, the video may be transmitted from the power adapter 310 to the display device 112. In this example, the video may be transmitted over wireless HDMI™.

At step 540, the video may be de-encapsulated. For example, the video may be retrieved by de-encapsulating the encapsulation added at step 520. In one example, step 540 may be performed by the proxy system 318 in the device 313. The actions performed at step 540 may be similar to those described above at step 450 in FIG. 4. At step 550, the video may be displayed, or be caused to be displayed. For example, the device 313 may cause the video to be displayed on the display device 112.

In one example, at step 530 or 540, the encapsulated data or the video may be transmitted from one device 313 to another device 313. For example, if a premises with two devices 313 has one power adapter 310 with a content transmission system 326, such as a Miracast™ system, a video in a format corresponding to the content transmission system 326 may be received at the power adapter 310, transmitted to the first device 313 that is connected to the power adapter 310, and then transmitted from the first device 313 to the second device 313 over a local area network (LAN).

Figure 6:
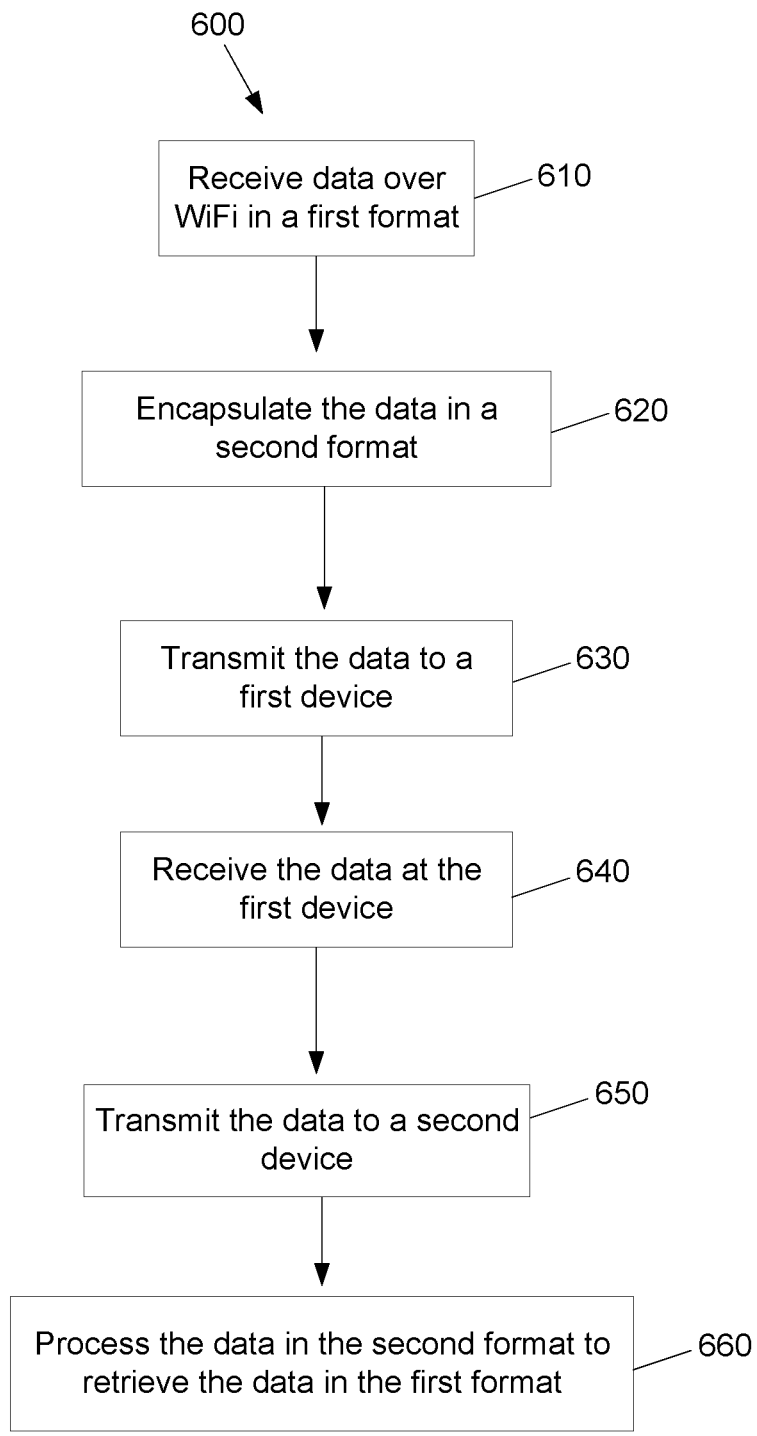
FIG. 6 is a flow diagram of a method for transmitting data to devices according to one or more illustrative aspects of the disclosure.

FIG. 6 is a flow diagram of a method 600 for transmitting data to devices according to one or more illustrative aspects of the disclosure. In one or more embodiments, the method 600 or one or more steps thereof may be performed by one or more computing devices or entities. For example, portions of the method 600 may be performed by components of the network 100 or the computing device 200. The method 600 or one or more steps thereof may be embodied in computer-executable instructions that are stored in a computer-readable medium, such as a non-transitory computer-readable medium. The steps in this flow diagram need not all be performed in the order specified and some steps may be omitted or changed in order.

At step 610, data may be received over Wi-Fi, or any other networking protocol, in a first format. Actions performed at step 610 may be similar to those described above at step 410 of FIG. 4. At step 620, the data received at step 610 may be encapsulated in, or according to, a second format. Actions performed at step 620 may be similar to those described above at step 420 of FIG. 4.

At step 630, the encapsulated data may be transmitted to a first device 313. For example, the encapsulated data may be transmitted from the power adapter 310 to the STB 113 belonging to a first subscriber of a media service or a communication network 100. At step 640, the encapsulated data may be received at the first device 313.

At step 650, the first device 313 may transmit the encapsulated data to a second device 313. For example, the STB 113 of a first subscriber may transmit the encapsulated data over the communication network 100 to the STB 113 of a second subscriber. In another example, at step 650, the data may be transmitted to a second STB 113 of the first subscriber. In this example, if a subscriber has two STBs 113 in their premises 102, the data may be transmitted between the first STB 113 in the premises 102 to a second STB 113 in the premises 102.

At step 660, the second device 313 may process the data in the second format to retrieve, or recover, the data in the first format. For example, the second device 313 might de-encapsulate the data. Actions performed at step 660 may be similar to those described above at step 450 of FIG. 4.

Using method 600, a user may transmit data in a wireless protocol over a network that comprises a combination of wired and wireless links. For example, the first subscriber may transmit a video, such as a video formatted according to the Miracast™ protocol, to a power adapter 310, which may use the proxy system 318 to encapsulate and transmit the video to a first STB 113, which may then transmit the video over the communication network 100 to a second STB 113. In this example, the second STB 113 may use the proxy system 318 to de-encapsulate the video and cause the video to be displayed on a display device 112 associated with the second STB 113.

Figure 7:
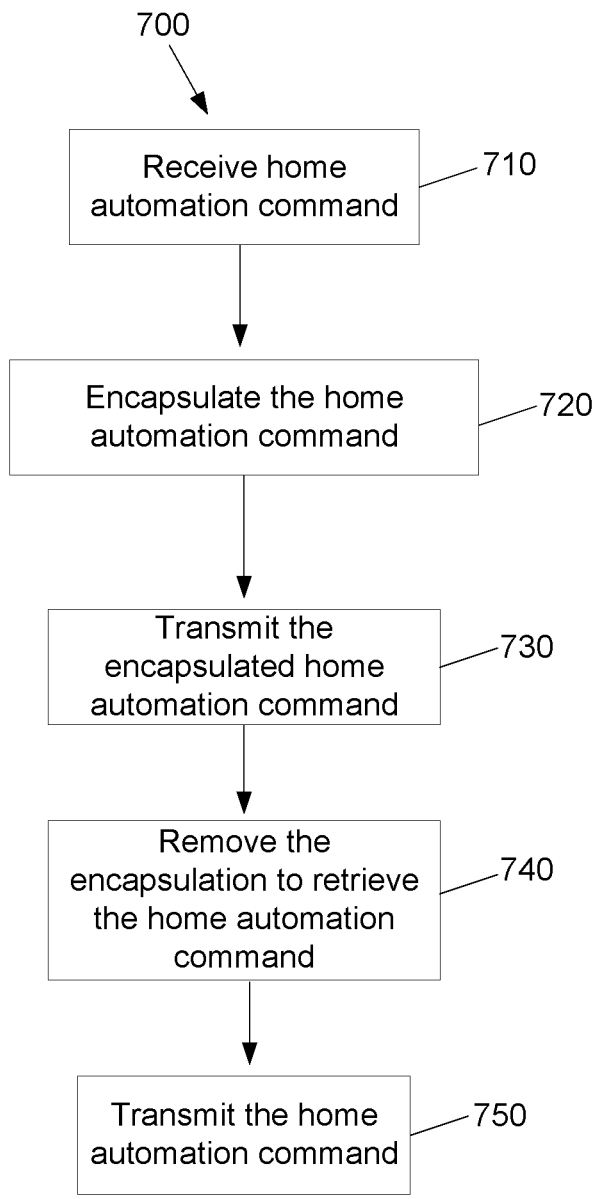
FIG. 7 is a flow diagram of a method for transmitting home automation commands according to one or more illustrative aspects of the disclosure.

FIG. 7 is a flow diagram of a method for transmitting home automation commands according to one or more illustrative aspects of the disclosure. In one or more embodiments, the method 700 or one or more steps thereof may be performed by one or more computing devices or entities. For example, portions of the method 700 may be performed by components of the network 100 or the computing device 200. The method 700 or one or more steps thereof may be embodied in computer-executable instructions that are stored in a computer-readable medium, such as a non-transitory computer-readable medium. The steps in this flow diagram need not all be performed in the order specified and some steps may be omitted or changed in order.

At step 710, a home automation command may be received. The home automation command may be received at a smart phone, a tablet, or any other computing device 200.

For example, a user may input a home automation command or setting into an application, i.e., an app, on the smart phone or tablet. The home automation command may be received in a format compatible with a home automation protocol. For example, a ZigBee™ command, a Z-Wave™ command, an X10™ command, an Insteon™ command, or any other type of home automation command or command compatible with a home automation system may be received.

At step 720, the home automation command may be encapsulated. The command may be encapsulated in a format that can be transmitted over a wired network, wireless network, or any combination of network types. For example, if the home automation command is received at step 710 in a ZigBee™ format, the home automation command may be encapsulated at step 720 into a format that can be transmitted over a wired network or wireless network.

In certain instances, step 720 might not be performed. For example, the home automation command may be received at step 710 in a format that is compatible with the communication network 100. In this example, step 720 may be skipped and the method 700 may proceed to step 730.

At step 730, the encapsulated home automation command may be transmitted. The command may be received over a local area network, a wide area network, or via the Internet. The command may be transmitted and received over the communication network 100. For example, the encapsulated home automation command may be transmitted over the communication network 100 from a smart phone or tablet, such as wireless device 116, to the power adapter 310.

The command may be issued from a device located remotely from the premises 102 to control a home automation system within the premises 102. For example, a user, or subscriber, while at work, may issue a home automation command to control an appliance in their home. In this example, the home automation command may be transmitted by a smart phone device, and travel over the communication network 100 to the power adapter 310 in the subscriber's home.

At step 740, the command may be de-encapsulated to retrieve, or recover, the home automation command. For example, the proxy system 318 in the power adapter 310 may remove the encapsulation from the received data.

The home automation command may be converted or altered at step 740. For example, if the home automation command is received in a platform independent format, and transmitted in the platform independent format, the platform independent command may be converted to a proprietary command, such as a ZigBee™ command, at step 740. In another example, the command may be converted from one protocol, such as a ZigBee™ command, to another protocol, such as an Insteon™ command.

At step 750, the home automation command may be transmitted to a home automation device or system. For example, the power adapter 310 may wirelessly transmit, via the home automation protocol system 324, a ZigBee™ command to turn on a light.

Using method 700, a user may be able to control a home automation system regardless of whether or not the user is proximal to the home. Additionally, the device 313, such as an STB 113, may use method 700 to control a home automation system. For example, the device 313 may issue commands to the home automation system to dim lights in a premises 102 when content is being viewed on the display device 112.

Figure 8:
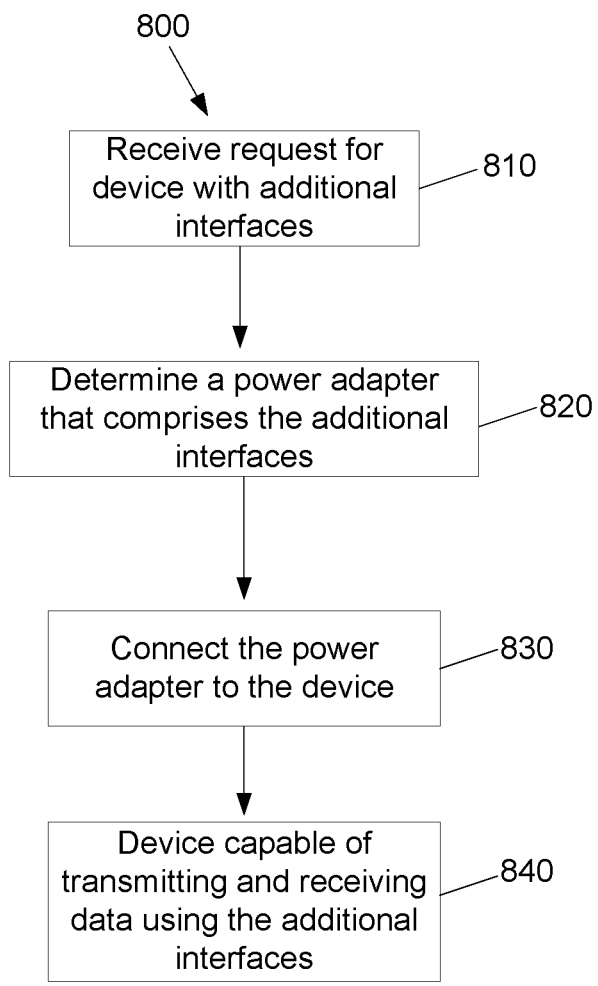
FIG. 8 is a flow diagram of a method for adding interfaces to a device according to one or more illustrative aspects of the disclosure.

FIG. 8 is a flow diagram of a method for adding interfaces to a device according to one or more illustrative aspects of the disclosure. In one or more embodiments, one or more steps of the method 800 may be performed by one or more computing devices or entities. For example, portions of the method 800 may be performed by components of the network 100 or the computing device 200. Portions of the method 800 may be embodied in computer-executable instructions that are stored in a computer-readable medium, such as a non-transitory computer-readable medium. The steps in this flow diagram need not all be performed in the order specified and some steps may be omitted or changed in order.

At step 810, a request is received for one or more additional interfaces for the device 313, for example, a set-top box 113. The interfaces may be networking interfaces, such as wireless or wired networking interfaces. For example, a user, such as a subscriber, having a device 313 without wireless HDMI capability may wish to add wireless HDMI functionality to their device 313. In another example, a user having a device 313 without a Wi-Fi access point 312 may wish to add a Wi-Fi interface to their device 313. In yet another example, a subscriber may modify their subscription, and a request may be automatically generated based on the modified subscription.

At step 820, a power adapter 310 may be determined that comprises the additional interfaces. A plurality of power adapters 310 may be available that comprise different components and interfaces. A power adapter 310 that comprises the additional interfaces requested at step 810 may be selected from the plurality of power adapters 310.

At step 830, the power adapter 310 determined at step 820 may be connected to the device 313. A power adapter 310 that was previously connected to the device 313 may be disconnected, and the power adapter 310 determined at step 820 may be connected to the device 313. For example, the power adapter 310 may be connected to the device 313 using an Ethernet cable. As described above and in FIG. 3, the power adapter 310 may provide power to the device 313.

At step 840, the device 313 may transmit and receive data using the interfaces in the power adapter 310. In one example, after connecting the power adapter 310 to the device 313, a proxy system 318 in the power adapter 310 may communicate with a proxy system 318 in the device 313. In this example, the device 313 may access the communication interfaces in the power adapter 310 as if the interfaces were integrated in the device 313.

Using method 800, additional functionality may be added to a device 313 by replacing the power adapter 310. Replacing the power adapter 310 may be more economical than replacing the device 313. For example, the functional capabilities of the device 313 may be modified over time by replacing the power adapter 310.

Although example embodiments are described above, the various features and steps may be combined, divided, omitted, rearranged, revised or augmented in any desired manner, depending on the specific outcome or application. Various alterations, modifications, and improvements will readily occur to those skilled in art. Such alterations, modifications, and improvements as are made obvious by this disclosure are intended to be part of this description, though not expressly stated herein, and are intended to be within the spirit and scope of the disclosure. Accordingly, the foregoing description is by way of example only, and not limiting. This patent is limited only as defined in the following claims and equivalents thereto.

The invention claimed is:

1. A method comprising:
receiving, by a power adapter, alternating current (AC) power;
outputting, by the power adapter, to a computing device coupled to the power adapter, and based on the received AC power, direct current (DC) power;
receiving, via a first wireless communication interface of the power adapter, content data; and
sending, to the computing device via a second wireless communication interface of the power adapter, the content data.

2. The method of claim 1, wherein the receiving the content data comprises receiving the content data in a first format, and
wherein the sending the content data comprises:
converting the content data from the first format to a second format different from the first format; and
sending, to the computing device via the second wireless communication interface, the content data in the second format.

3. The method of claim 2, wherein the first format is associated with a wireless peer-to-peer protocol.

4. The method of claim 1, wherein the second wireless communication interface comprises a wireless high-definition multimedia interface (HDMI).

5. The method of claim 1, wherein the first wireless communication interface comprises a content transmission interface.

6. The method of claim 1, further comprising:
receiving, via the first wireless communication interface, a home automation command; and
sending, to the computing device via the second wireless communication interface, the home automation command.

7. The method of claim 1, wherein the received content data comprises encapsulated data, and wherein the method further comprises de-encapsulating the encapsulated data.

8. A power adapter comprising:
power input circuitry configured to receive alternating current (AC) power;
power output circuitry configured to output, based on the received AC power and to a computing device coupled to the power adapter, direct current (DC) power;
a first wireless communication interface configured to receive content data; and
a second wireless communication interface configured to wirelessly send, to the computing device, the content data.

9. The power adapter of claim 8, wherein the first wireless communication interface is configured to receive the content data by receiving the content data in a first format, and
wherein the second wireless communication interface is configured to send the content data by sending, to the computing device via the second wireless communication interface, the content data in a second format different from the first format.

10. The power adapter of claim 9, wherein the first format is associated with a wireless peer-to-peer protocol.

11. The power adapter of claim 8, wherein the second wireless communication interface comprises a wireless high-definition multimedia interface (HDMI).

12. The power adapter of claim 8, wherein the first wireless communication interface comprises a content transmission interface.

13. The power adapter of claim 8, wherein the first wireless communication interface is further configured to receive a home automation command, and
wherein the second wireless communication interface is further configured to send, to the computing device, the home automation command.

14. The power adapter of claim 8, wherein the received content data comprises encapsulated data, and wherein the power adapter further comprises a processor configured to de-encapsulate the encapsulated data.

15. A system comprising:
a computing device; and
a power adapter coupled to the computing device, wherein the power adapter comprises:
power input circuitry configured to receive alternating current (AC) power;
power output circuitry configured to output, to the computing device based on the received AC power, direct current (DC) power;

a first wireless communication interface configured to receive content data; and a second wireless communication interface configured to wirelessly send, to the computing device, the content data, wherein the computing device comprises:

power input circuitry coupled to the power output circuitry of the power adapter, wherein the power input circuitry is configured to receive the DC power; and a wireless communication interface configured to wirelessly receive the content data.

16. The system of claim 15, wherein the first wireless communication interface of the power adapter is configured to receive the content data by receiving the content data in a first format, and wherein the second wireless communication interface of the power adapter is configured to send the content data by sending, to the computing device via the second wireless communication interface, the content data in a second format different from the first format.

17. The system of claim 16, wherein the first format is associated with a wireless peer-to-peer protocol.

18. The system of claim 15, wherein the second wireless communication interface of the power adapter comprises a wireless high-definition multimedia interface (HDMI).

19. The system of claim 15, wherein the first wireless communication interface of the power adapter comprises a content transmission interface.

20. The system of claim 15, wherein the first wireless communication interface of the power adapter is further configured to receive a home automation command, and wherein the second wireless communication interface of the power adapter is further configured to send, to the computing device, the home automation command.

* * * * *